US011001362B2

(12) United States Patent
Chaumel et al.

(10) Patent No.: US 11,001,362 B2
(45) Date of Patent: May 11, 2021

(54) AIRCRAFT CANOPY HAVING A WINDOW PANE WITH AN INTEGRATED FLANGE AND LOAD-TRANSFERRING AND DISTRIBUTING MEMBERS

(71) Applicants: Airbus Operations S.A.S., Toulouse (FR); Airbus S.A.S., Blagnac (FR)

(72) Inventors: Pascal Chaumel, Plaisance du Touch (FR); Johan Dentesano, Colomiers (FR); Emily Parken, Toulouse (FR)

(73) Assignees: Airbus Operations S.A.S.; Airbus S.A.S.

( * ) Notice: Subject to any disclaimer, the term of this patent is extended or adjusted under 35 U.S.C. 154(b) by 291 days.

(21) Appl. No.: 16/166,328

(22) Filed: Oct. 22, 2018

(65) Prior Publication Data
US 2019/0118928 A1    Apr. 25, 2019

(30) Foreign Application Priority Data
Oct. 24, 2017  (FR) ..................... 17 60038

(51) Int. Cl.
*B64C 1/14*         (2006.01)
(52) U.S. Cl.
CPC .......... *B64C 1/1492* (2013.01); *B64C 1/1484* (2013.01)
(58) Field of Classification Search
CPC .... B64C 1/1492; B64C 1/1484; B64C 1/1476
See application file for complete search history.

(56) References Cited

U.S. PATENT DOCUMENTS

| 2,507,036 | A |   | 5/1950  | McCrumm et al. |
|-----------|---|---|---------|----------------|
| 3,382,630 | A |   | 5/1968  | Chivers |
| 4,004,388 | A | * | 1/1977  | Stefanik ............ B32B 17/10293 52/204.593 |
| 6,818,281 | B2 | * | 11/2004 | Blevins ............. B32B 17/10036 296/187.03 |
| 6,905,094 | B2 |  | 6/2005  | Dazet et al. |
| 7,552,896 | B2 | * | 6/2009  | Coak ..................... B64C 1/1492 244/129.3 |
| 2009/0245968 | A1 | * | 10/2009 | Cavailles .............. F16B 37/044 411/181 |

FOREIGN PATENT DOCUMENTS

| EP | 0 322 776 A2 | 7/1989 |
| EP | 1 300 333 A1 | 4/2003 |
| FR | 2 899 291 A1 | 10/2007 |

* cited by examiner

*Primary Examiner* — Justin M Benedik
(74) *Attorney, Agent, or Firm* — Lerner, David, Littenberg, Krumholz & Mentlik, LLP

(57) ABSTRACT

An aircraft canopy includes a window pane, a frame from a primary structure of the aircraft, and a flange fastened to the frame with fastening screw, characterized in that: the flange is secured to the peripheral edge of the window pane by engaging of at least one plate of the flange between plies of the window pane, so that flange and window pane form an all in one-piece assembly, at each fastening screw, a load-transferring and distributing member is arranged between an outer surface of the flange and the fasting screw, a cavity being provided in the flange for receiving the load-transferring and distributing member, the member having a recess for receiving the screw head.

12 Claims, 3 Drawing Sheets

AIRCRAFT CANOPY HAVING A WINDOW PANE WITH AN INTEGRATED FLANGE AND LOAD-TRANSFERRING AND DISTRIBUTING MEMBERS

FIELD OF THE INVENTION

The invention relates to an aircraft canopy and its fastening device. The invention applies to all aircraft types equipped with a canopy, in particular to civil and military aircraft as well as helicopters. The invention applies more particularly to canopy window panes for assembly from outside.

BACKGROUND OF THE INVENTION

Many aircraft canopies have six window panes (two in front position, two in side position and two in rear position, relative to the pilots). The two front window panes are assembled and flanged from outside the aircraft. In effect, the presence of the navigation screens in the cockpit does not allow assembly of the front window panes from inside the aircraft.

Two main fastening techniques exist for fastening a canopy window pane to the primary structure of an aircraft in the case of window pane assembly from the outside. It is important to point out above all that assembling a canopy window pane must be rapid and easy in order to limit the costs thereof. The same applies to disassembling the window pane, since the latter must be replaced several times during the life of the aircraft and this replacement leads to a costly grounding of the aircraft.

According to a first technique of fastening from outside, the canopy window pane is fastened directly to a frame of the aircraft structure by screws that pass through the window pane along its peripheral edge. This first technique has the major disadvantage that the fastening screws apply mechanical stresses on the canopy window pane, which give rise to risks of breaking it. These stresses can be due in particular to deformations of the aircraft structure in extreme flight conditions and to the difference in expansion between the canopy window pane, generally of glass, and the metal frame on which it rests, during temperature changes that arise during climb and descent phases of the aircraft.

According to the second known technique of fastening from outside, the peripheral edge of the canopy window pane is clamped between the frame of the primary aircraft structure and a flange fastened to the frame by fastening screws. These fastening screws do not pass through the canopy window pane and are not in contact with it, such that the aforementioned problems relating to the first technique do not arise.

The fastening screws used to fasten the flange to the structure frame are generally countersunk screws that are integrated in the thickness of the flange. The use of countersunk screws has multiple disadvantages, including the fact that this type of screw imposes severe machining tolerances in terms of alignment of the fastening holes made in the structure frame so as to accommodate the screws common to one flange. This high machining precision results in a high implementation coup. Another major disadvantage is the difficulty of removing the canopy when the latter must be replaced. In effect, the countersunk screws are difficult to slacken especially when they are seized, the risk of seizing being increased for screws accommodated in holes that are not perfectly aligned. Furthermore, the means of gripping these countersunk screws consist of a hollow indentation in the head that does not allow the torque applied during tightening to be controlled easily and that limits the torque that can be applied during unscrewing. What is more, repeated slippage of the screwdriver on the screw head during tightening can damage this gripping indentation, which subsequently makes unscrewing even more difficult.

Certain known canopy fastening devices make it possible to use, in lieu and instead of countersunk screws, hexagon-head screws whose gripping means are provided by the head itself and its hexagonal shape, and whose bearing surface on the flange is substantially flat. The disadvantage of these hexagon-head screws is that they do not allow good air and moisture sealing to be guaranteed between the screw and the flange and that it is recommended to use, in combination with these screws, a sealing material such as a PR mastic which requires several hours of curing time (up to more than 24 hours). The use of this mastic increases the time—and hence the cost—of assembling the canopy, but also the time of disassembling the canopy when it must be replaced as it is then necessary carefully to remove every trace of mastic remaining on the frame and the flange before installing the new canopy window pane. The removal of the mastic requires a suitable tool whose use is not without risks for the user and for the structure of the aircraft.

BRIEF SUMMARY OF THE INVENTION

EP1300333 has proposed a device for fastening a canopy by clamping the peripheral edge of the canopy window pane between a frame and a flange, making it possible on one hand to use hexagon-head screws and on the other to dispense with the use of a curable mastic. Aspects of the present invention apply quite particularly to this prior device, of which it constitutes an improvement.

An aspect of the invention may provide an aircraft canopy having a window pane for assembly from outside whose fastening device makes it possible to simplify the assembly and disassembly operations so as to limit the aircraft grounding times when replacing the canopy window pane. Another aspect of the invention may provide a device for fastening a canopy window pane of the type with a flange fastened by screws to a frame of the primary aircraft structure (second technique of fastening from outside recalled as introduction), making it possible to use hexagon-head screws and making it possible to control in a simple and reliable manner the prestressing imposed by the screws for fastening the flange at the peripheral edge of the window pane.

To do so, an embodiment of the invention includes an aircraft canopy comprising:

a layered window pane (that is to say laminated), comprising a superposition of plies and having a peripheral edge, noting that the plies of the window pane can be of glass, of acrylic or other transparent polymeric material, a frame belonging to a primary structure of the aircraft, and a flange fastened to the frame by fastening screws having screw heads retracted into the thickness of the flange, the flange being fastened to the peripheral edge of the window pane, such that window pane and flange form a continuous assembly that can be qualified as window pane with integrated flange, at each fastening screw of the flange, a load-transferring and distributing member is inserted between an outer surface (surface oriented towards the outside of the aircraft) of the flange and said fastening screw, a cavity being arranged in the flange to accommodate the member, a hole (through) being provided at the bottom of the cavity for passing the screw shank, the load-transferring and distributing member in turn having a recess for accommodating the screw head and a drilled hole for passing the screw shank.

The canopy according to an embodiment of the invention is characterized in that the flange is also laminated, that is to say that it comprises a superposition of plates, for example, metal plates. In particular, the flange according to an embodiment of the invention comprises an outer plate covering the peripheral edge of the laminated window pane and an inner plate forming an inner surface (oriented towards the inside of the cockpit) of the flange, at least part of which bears against a web of the frame. Furthermore, at least one of the plates of the flange, qualified as anchoring plate, is embedded between two plies of the window pane along the peripheral edge of the window pane.

As will be explained in more detail during the description, it is possible, in such a canopy, to have only dry joints (like the device of EP1300333), which allow rapid assembly and disassembly of the canopy window pane.

Furthermore, the interlacing of the plates of the flange and the plies of the window pane makes it possible to fasten the flange to the plate, and thus to obtain a window pane with integrated flange according to the invention, and this without additional sealing material (apart from the material of the interposed layer itself in which the anchoring plate is embedded).

Furthermore, the load-transferring and distributing member makes it possible at points to limit the pressure exerted on the window pane and to control the forces to which it is exposed.

According to an advantageous characteristic, the cavity and the member sink into the thickness of the flange at least down to the anchoring plate, preferably down to the inner plate. In other words, the cavity and the member have a depth (dimension along a direction orthogonal to the plane of the window pane) at least equal to the thickness of the stack of plates formed between the anchoring plate and the outer plate (including the latter two), such that all the plates are retained by the member when they are pushed by the window pane subjected to the pressure prevailing inside the cockpit. In other words, all the plates from the anchoring plate are considered as working plates. The member also preferably retains the inner plate (and the potential intermediate plates between the inner plate and the anchoring plate) so that all the plates of the flange work to hold the window pane; the holding forces imposed by the fastening screws are transmitted and distributed in this case to all the plates of the flange; the design of the member is thus optimized.

Thus dimensioned, the member fully fulfils its functions consisting of recovering the forces (due to the pressure differences between the inside of the cockpit and outside the aircraft, at altitude) exerted by the window pane on the flange and of distributing the forces imposed on the flange by the fastening screws in the assembly of the plates of the flange.

According to a possible characteristic, the fastening screws of the flange are hexagon-head screws and the bottom of the recess of each load-transferring and distributing member has a flat surface.

According to a possible characteristic, the anchoring plate is an intermediate plate between the outer plate and the inner plate of the flange. To be noted however, that it cannot be the plate adjacent to the outer plate, since the anchoring plate must be pinned between two plies of the window pane, in an interposed layer of the window pane.

As a variant, the anchoring plate is the inner plate.

According to a possible characteristic, the flange comprises two anchoring plates, that is to say that two plates of the flange are embedded in the laminated window pane.

According to a possible characteristic, at least one of the cavities, and preferably each cavity in the flange is delimited by sections of the plates of the flange.

Preferably, at least one of the cavities, and preferably each cavity in the flange, has a width decreasing from the outside of the aircraft. Each cavity thus has a width decreasing from the outer plate to the inner plate of the flange.

According to a possible characteristic, at least one cavity, and preferably each cavity, is delimited by a wall having at least one projection or a variation of curvature in a plane containing the axis of the screw, the projection or variation of curvature forming a bearing surface for the member directing the forces exerted by the flange to the member (and vice-versa) along a direction substantially parallel to the axis of the screw.

According to a possible characteristic, at least one of the cavities, preferably each cavity, is delimited by a peripheral wall comprising from the inside to the outside of the aircraft:

a cylindrical hole in the inner plate of the flange, the load-transferring and distributing member having a cylindrical tubular lower portion inserted in this hole so as to rest on the frame; this cylindrical tubular lower portion of the member could be eliminated but it is advantageous because it makes it possible to control the prestressing imposed on the window pane when the fastening screw is tightened; suitable dimensions and rigidity of this cylindrical tubular portion in effect make it possible to fix this prestressing to a desired value so as to prevent the fastening screw from excessively compressing the peripheral edge of the window pane, which, as a bonded assembly, has a certain fragility;

a stepped portion formed by sections of the plates of the flange, the load-transferring and distributing member having an outer lateral side with successive projections that is complementary to this stepped portion of the cavity wall.

As a variant, at least one of the cavities, and preferably each cavity in the flange is delimited by a peripheral wall formed by sections of the plates of the flange, said peripheral wall comprising, from the outside to the inside the aircraft:

an upper projection, for example at the junction between the outer plate and the plate adjacent to it of the flange, projection on which an upper collar of the load-transferring and distributing member comes to bear; in other words, the section of the outer plate of the flange is radially set back relative to the section of the plate that is adjacent to it; this upper projection is not indispensable but it contributes to a better transfer of forces, a truncated portion, a lower projection, for example at the junction between the inner plate and the plate adjacent to it, or between two intermediate plates, and preferably above the anchoring plate, for example at the junction between the anchoring plate and the plate situated above it (that is to say on the outside), a cylindrical hole in the inner plate of the flange, the load-transferring and distributing member having a cylindrical tubular lower portion inserted in this hole so as to rest on the frame. The value of this cylindrical tubular lower portion was described above.

As a variant, at least one of the cavities, preferably each cavity, is delimited by a peripheral wall formed by the outer side of the outer plate of the flange, said outer plate turns down into the cavity towards the inside of the aircraft.

The flange can also include cavities of various shapes chosen the shapes previously described.

In a possible embodiment, one or more, and preferably all of the following sealing means are provided:

for each screw for fastening the flange, a groove is arranged in an inner side of the flange (side of the flange oriented towards the inside of the aircraft) facing the frame around the hole provided for passing the screw shank, this groove accommodating a dry O ring seal;

a dry peripheral seal is interposed between a peripheral lateral side of the flange and a flank of the frame, said peripheral dry seal comprises a lip embedded in a slot arranged in the peripheral lateral side of the flange;

a peripheral seal is interposed between the outer plate of the flange and the outer front side of the laminated window pane, that is to say, between the outer plate of the flange and the outer ply of the glass. This seal preferably extends at least between the peripheral edge of the outer ply of the window pane and the facing flange plate. It is not necessary for this peripheral seal to be a dry seal as it is not intended to be removed when the window pane is changed (the window pane and integrated flange then being changed), neither does the use of a peripheral seal based on a curable material penalize the manufacturing lead times of the aircraft, as the window pane and the flange can be pre-assembled in hidden time. This being the case, a dry seal will be favored;

a peripheral seal is interposed between the anchoring plate (of the flange) and one of the two plies (of the window pane) that are near the anchoring plate and surround it. This seal is preferably interposed between the anchoring plate and the one of the nearby plies that is contiguous with the anchoring plate, that is to say, that touches the anchoring plate (or rather that would touch it in the absence of a seal), this ply advantageously being a thick structural ply of the laminated window pane, preferably the ply that faces the anchoring plate on the inner side of the aircraft (the forces due to pressurization of the cockpit thus tend to compress the seal). Once again, this peripheral seal can be a curable seal as it not intended to be removed when the window pane is changed, but it is preferably a dry seal, for example of silicone.

At each screw fastening the flange, a plug is preferably provided to close the recess accommodating the screw head. The plug can be fixed in the recess by interlocking. To that effect, the load-transferring and distributing member comprises an upper inner collar that extends radically towards the inside of the recess, and the plug is equipped with hooks with elastic deformation able to cooperate with the inner collar. Each plug has an upper side that is flush with the outer side of the member, which in turn is flush with the outer side of the flange so as to limit the aerodynamic perturbations engendered by the presence of the cavities in the flange and the recesses in the members.

According to a possible characteristic, the window pane integrates an electric circuit powered by a connector that is connected to the window pane by an electric cable emerging from the window pane. In known canopies, this connector is directly bonded to the inner side of the window pane.

The invention also extends to an aircraft canopy or its fastening device characterized in combination by all or some of the characteristics mentioned above and below. In other words, all the possible combinations based on the characteristics described in the present application conform to the invention as long as there is no incompatibility among the combined characteristics.

BRIEF DESCRIPTION OF THE DRAWINGS

Other details and advantages of the present invention will emerge on reading the following description, which refers to the attached schematic drawings and refers to preferred embodiments, provided as non-limitative examples. On these drawings.

DETAILED DESCRIPTION

Figure 1:
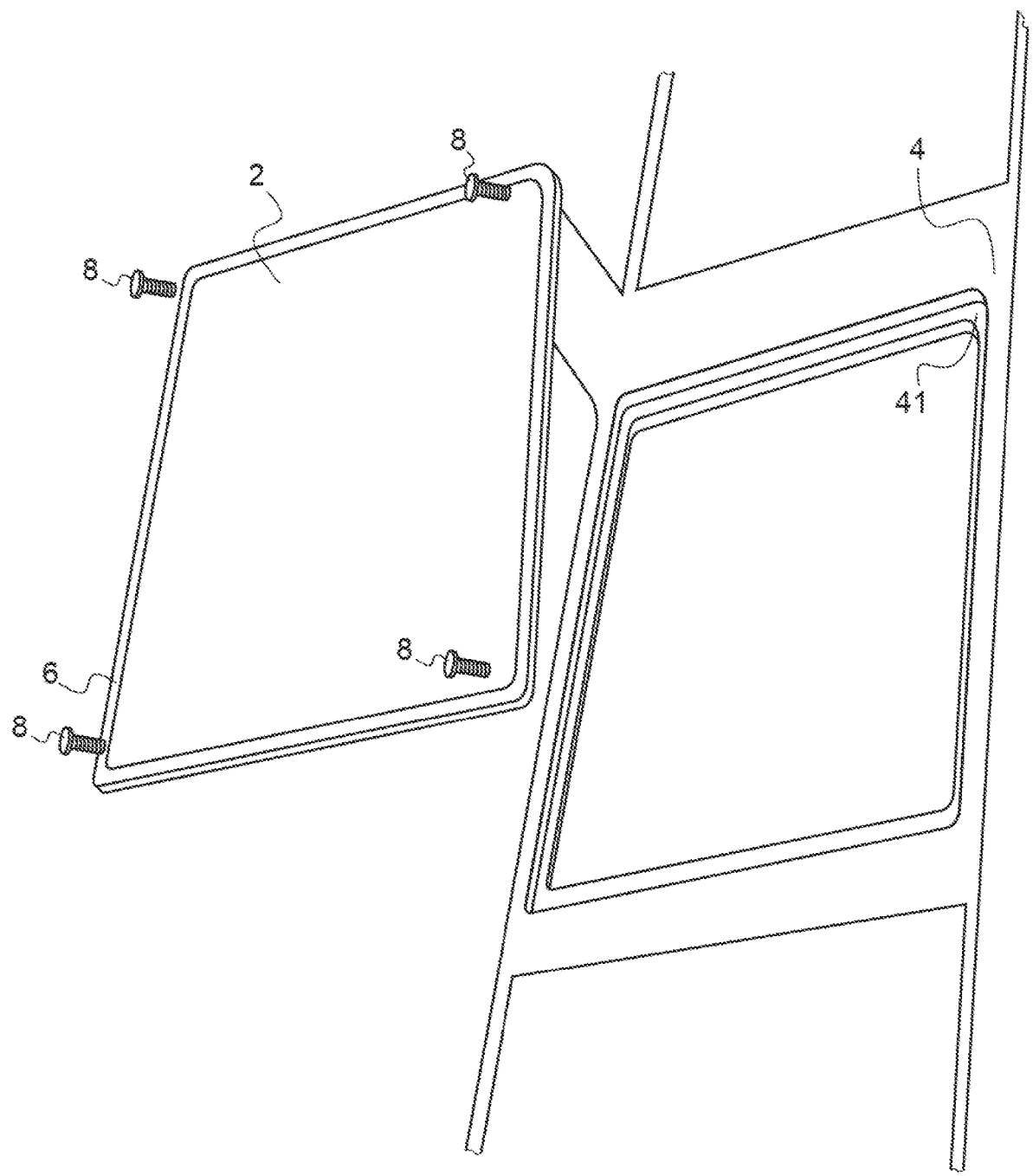
FIG. 1 is an exploded schematic view, in perspective, of a canopy window pane of the prior art for assembly from outside.

In the detailed description that follows, the terms "upper", "lower", "horizontal" or "vertical" are used with reference to a vertical direction given by the height of the drawing board in question and not with reference to terrestrial gravity, the illustrated devices not necessarily being shown in a position that corresponds to their installation position on the aircraft.

Figure 3:
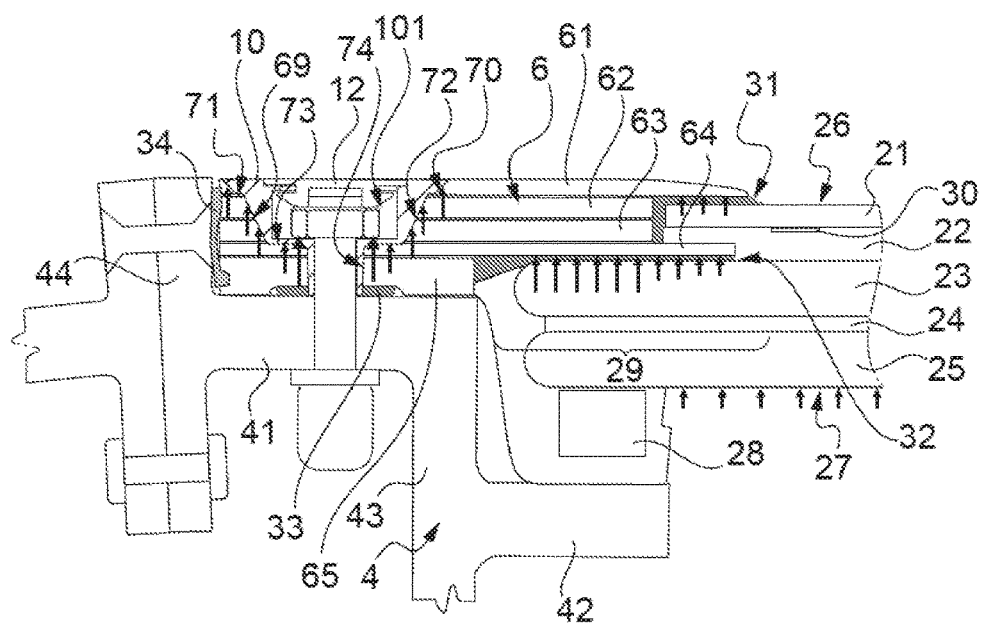
FIG. 3 is a schematic view, sectional, of a canopy according to an embodiment of the invention, showing a first embodiment of the load-transferring and distributing member proposed by the invention.
Figure 4:
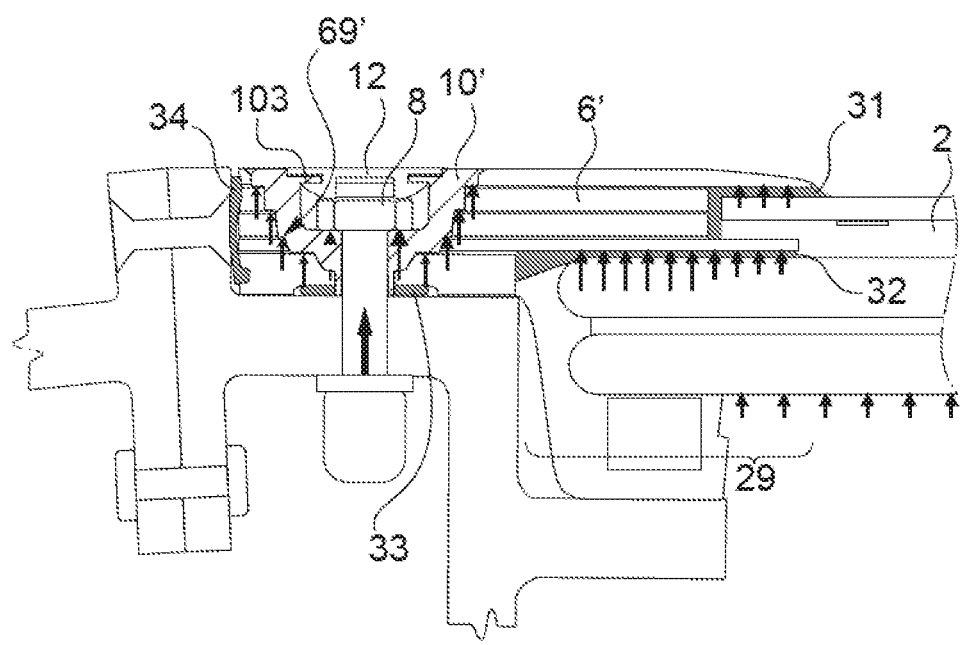
FIG. 4 is a schematic view, sectional, of a canopy according to an embodiment of the invention, showing a second embodiment of the load-transferring and distributing member proposed by the invention.
Figure 5:
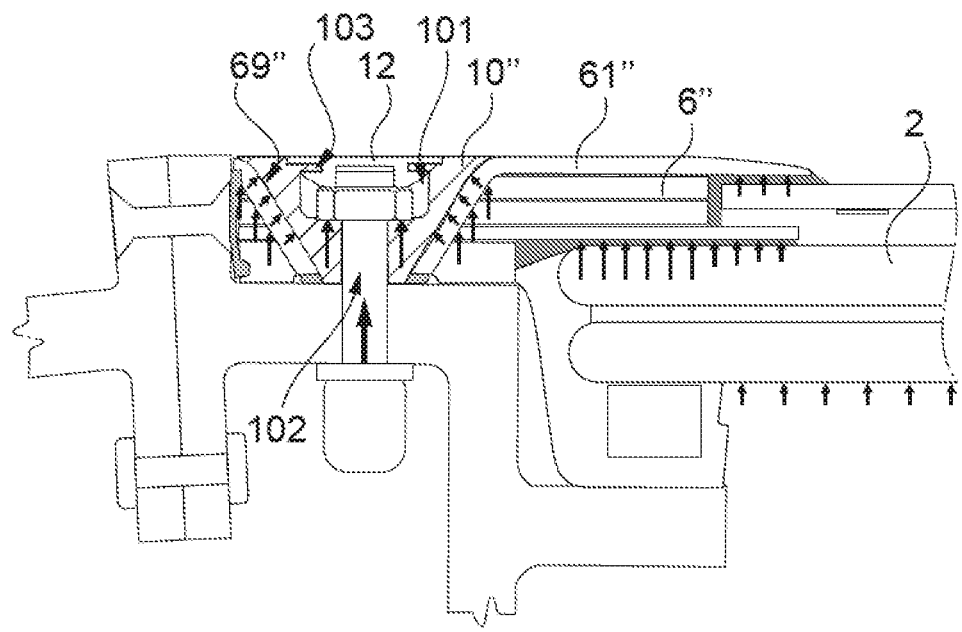
FIG. 5 is a schematic view, sectional, of a canopy according to an embodiment of the invention, showing a third embodiment of the load-transferring and distributing member proposed by the invention.

Thus for example, in FIGS. 3 to 5, which are sections along planes containing the axis of a screw for fastening the canopy in which the axis of the screw is shown vertically on the figure, a plane qualified as horizontal on these figures is a plane orthogonal to the axis of the fastening screw and consequently substantially parallel to the plane of the canopy window pane.

Figure 2:
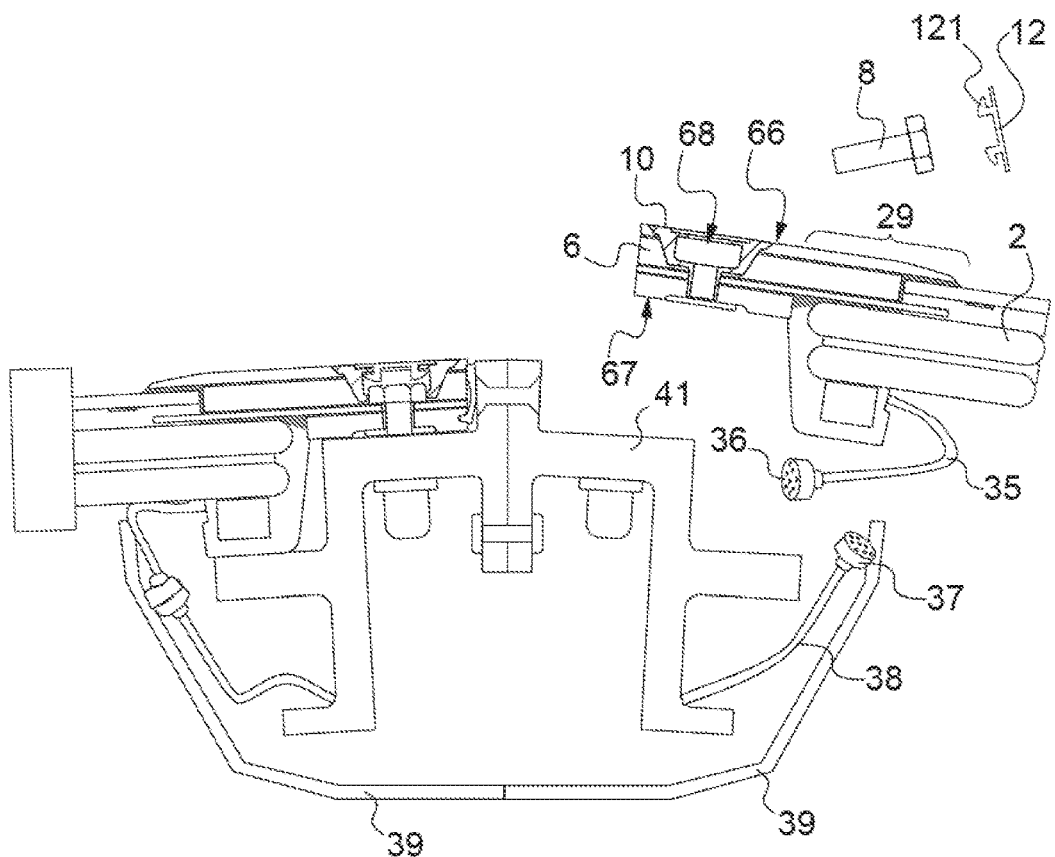
FIG. 2 is an exploded schematic view, sectional, of a canopy according to an embodiment of the invention.

A canopy according to an embodiment of the invention comprises (see in particular FIGS. 1 and 2) a window pane 2 with integrated flange 6, intended to be assembled on a frame 4 of the primary structure of an aircraft. Contrary to known prior canopies, in a canopy according to an embodiment of the invention, the window pane 2 and the flange 6 are pre-assembled.

A canopy according to an embodiment of the invention comprises a window pane 2 with integrated flange 6 intended to be assembled on a frame 4 of the primary structure of an aircraft. Contrary to known prior canopies, in a canopy according to an embodiment of the invention, the window pane 2 and the flange 6 are pre-assembled (see FIG. 2). The frame 4, however, can be similar to a known frame.

The flange 6 according to an embodiment of the invention is a laminated flange. This means that the flange 6 comprises a superposition of metal plates, numbering five in the illustrated non-limitative examples. More precisely, the flange 6 includes an outer plate 61 that forms the outer side 66 of the flange, oriented towards the outside of the aircraft, three intermediate plates 62, 63 and 64, and an inner plate 65 forming the inner side 67 of the flange, oriented towards the inside of the aircraft, and at least part of which bears against the frame 4.

Similarly, the window pane 2 is a laminated window pane, which means that it comprises a superposition of layers alternating plies of glass (or other transparent material, for example, an acrylic) and interposed layers of a transparent sealing material. More precisely here, the window pane 2 successively comprises (from the outside towards the inside of the aircraft): a thin outer ply 21, forming the outer side 26 of the window pane (side oriented towards the outside of the aircraft), an interpose 22 of a greater thickness in which an electric circuit 30 is sunk, a thick median ply 23, an interpose 24 of a lesser thickness and a thick inner ply 25 forming the inner side 27 of the window pane (side oriented towards the inside of the aircraft). The median ply 23 and inner ply 25 are structural plies, which confer on the window pane its bending strength. At its peripheral edge 29, the window pane additionally comprises a block 28.

The frame 4 comprises:

an upright 43 that extends in a plane substantially orthogonal to the plane of the window pane 2, a web 41 that extends in a plane substantially parallel to the plane of the window pane 2 and is extended by a flank 44 extending substantially orthogonally to the plane of the window pane towards the outside, an inner ledge or heel 42 extending substantially parallel to the plane of the window pane 2 from the upright 43.

The flange 6 is fastened to the window pane 2 by interlocking of the metal plates of the flange in the lamination of the window pane and conversely. In other words, the glass plies of the window pane and the metal plates of the flange are superposed such that, on one hand, the outer plate 61 of the flange extends over the outer ply 21 of the window pane all along the peripheral edge 29 of the window pane, and on the other, at least one metal plate 64 of the flange, called anchoring plate, is interposed between two glass plies of the window pane, here the plies 21 and 23, penetrating in an interposed layer 22.

In the case of a window pane such as that illustrated, which is conventional in that it comprises an inner structural ply (the ply 25), a median structural ply 23 and a thinner outer ply 21, it is preferable for the anchoring plate according to an embodiment of the invention to be inserted in the window pane at the interpose 22 between the thin outer ply and the median structural ply, so that the ply of the window pane bearing most of the forces under the effect of the pressure difference between the pressurized cockpit and the outside of the aircraft is the median structural ply 23. In the illustrated configuration, the anchoring plate is consequently the intermediate plate 64. It could be another intermediate plate with the exception of the intermediate plate adjacent to the outer plate. It could also be the inner plate 65, but the consequence of this would be that the thickness of the interpose 22 would have to be increased, which is of no value and is therefore undesirable (this increase in thickness resulting in an unnecessary increase in the weight of the window pane).

In order to guarantee correct fastening of the flange to the window pane, the anchoring plate penetrates the laminated window pane over an anchoring depth (width of the plate strip sunk in the interposed layer and enclosed between the two glass plies), for example of the order of 15 mm, and preferably equal to at least 10 mm. In practice, this anchoring depth depends on the quality of the adhesion of the interpose 22 to the anchoring plate 64.

The inner side 67 of the flange is pressed against the web 41 of the frame. As indicated previously, the peripheral edge 29 of the window pane 2 is equipped with a block 28 that makes it possible to rectify the thickness of the window pane so that its peripheral edge rests on the heel 42 of the frame when the flange supported by the window pane rests on the web 41 of the frame. This block 28 makes it possible to use window panes of different thickness from different suppliers while keeping an identical aircraft interface, that is to say, a frame having fixed given dimensions. In effect, the window panes offered by the different suppliers are of variable thickness according to the material used to manufacture them. If a very thick window pane is used, this block 28 can disappear.

The flange 6 is fastened to the frame 4 by means of a plurality of hexagon-head screws 8. To do this, a cavity 68, delimited by a peripheral wall 69, is provided in the flange 6 at each fastening screw 8.

According to an embodiment of the invention, a load-transferring and distributing member 10 is interposed between the fastening screw 8 and the flange 6 inside the cavity 68. Exceptionally, and for the sake of clarity, the sectional parts in FIGS. 2 to 5 are not hatched with the exception of the member 10.

The load-transferring and distributing member 10 comprises a recess 101 for accommodating the hexagonal screw head of the fastening screw 8. At the bottom of the recess 101, a drilled hole 102 (see FIG. 5, this drilled hole being common to the embodiments of FIGS. 3 to 5) allows the passage of the shank of the fastening screw 8. In the bottom of the recess 101, the contact surface between the screw head and the member is flat. The member 10 furthermore has an outer lateral side that is complementary to the peripheral wall 69 of the cavity 68.

The tightening torque of the fastening screw 8, transmitted to the member at the flat contact surface (of reduced dimension) between the hexagonal screw head and the bottom of the recess 101, is distributed over the outer lateral side of the member (of larger dimension) when it is transmitted to the flange 6. The member 10 therefore makes it possible locally to limit the pressure exerted on the flange by distributing over a larger surface the force received from the fastening screw on one hand and the forces exerted by the window pane on the other under the effect of the pressurization of the cockpit (said forces of pressurization of the cockpit are illustrated by arrows on FIGS. 3 to 5). This distribution makes it possible to avoid compression of the flange 6 at the fastening screws and also to limit the pressure exerted at points on the peripheral edge of the window pane facing each fastening screw.

The cavity 68 and the member 10 can adopt different shapes, including those illustrated on FIGS. 3 to 5. The members 10, 10' and 10" illustrated on these three figures have in common in particular that they are rotationally symmetrical and that they include a recess 101 such as that previously described, but they differ in the shape of their outer lateral sides coinciding with the peripheral wall 69, 69', 69" of the cavity.

On FIG. 3, it can be observed that the cavity 68 is delimited by a peripheral wall 69 successively formed (from the outside towards the inside of the aircraft), by the chamfered section 70 of the outer plate 61 of the flange, a projection 71 horizontal to the junction between the outer plate 61 and the intermediate plate 62, a truncated portion 72 formed by the oblique sections of the intermediate plates 62 and 63, a projection 73 horizontal to the junction between the intermediate plates 63 and 64, a cylindrical portion formed by a hole 74 passing through the intermediate plate 64 and the inner plate 65.

In a complementary fashion, the outer lateral side of the member 10 successively has an outer upper collar with chamfered edge, a first flat portion bearing against the projection 71, a truncated portion in contact with the truncated portion 72 of the cavity wall, a second flat portion bearing against the projection 73 of the cavity, a cylindrical portion facing the cylindrical portion 74 of the cavity, and a flat end that rests on the web 41 of the frame 4.

In the variant illustrated on FIG. 4, the peripheral wall 69' of the cavity has a succession of steps formed by horizontal projections at the junctions between the different metal plates of the flange 6'. An additional projection is formed in the thickness of the inner plate in order to guarantee a distance calibrated by the thickness of the member. This thickness between the hexagonal screw head and the location where the member is in contact with the frame 41 makes it possible not to compress the films of adhesive situated between the plates.

In the variant illustrated on FIG. 5, the cavity has a smooth globally truncated peripheral wall 69" formed by the outer side of the outer plate 61" of the flange, said outer plate is turned down towards the inside of the cavity against the sections of the other plates of the flange.

In the three illustrated examples, sealing is ensured by four dry seals such as silicone seals:

a first dry seal 31 that extends "horizontally" between the outer plate 61 (or 61' or 61") of the flange and the outer ply 21 of the window pane, said seal also extends "vertically" between the peripheral edge of the outer ply 21 and the flange (or, more precisely, the intermediate plate 62) and between the peripheral edge of the interpose 22 and the flange (or more precisely, the intermediate plate 63); the seal 31 therefore has a straight section in the shape of an angle piece, a second dry seal 32 that extends "horizontally" between the anchoring plate 64 and the median ply 23 of the window pane from the anchoring end of the anchoring plate 64 to the inner plate 65 of the flange, a third dry O ring seal 33, surrounding the cylindrical tubular portion of the member and the shank of the fastening screw 8. This dry O ring seal is compressed between the inner plate 65 of the flange and the web 41 of the frame. It is accommodated in a groove arranged in the inner side of the inner plate 65 (this groove could be arranged as a variant on the outer side of the web 41), a fourth dry seal 34 pinned between the peripheral edge of the flange 6, 6', 6" and the flank 44 of the frame; this seal preferably has a lip, for example in its lower part, which is inserted in a slot arranged in the peripheral edge of one of the plates of the flange, here the inner plate 65.

Each member 10, 10', 10" has an outer side that extends and is flush with the outer side 66 of the flange so as to limit aerodynamic perturbations that could be due to the presence of the cavity 68 and of the member.

For the same reasons, the recess 101 of each of the members is closed by a plug 12 whose outer side extends at the outer side 66 of the flange. In order to simplify the installation, this plug 12 preferably comprises hooks 121 (see FIG. 2) with elastic deformation that bear against an inner collar 103 of the member (that is to say, a collar extending radically towards the inside of the member). When a plug is put in place by offering it up above the recess and pressing the plug from the outside against the member, the hooks 121 of the plug are elastically pushed by the inner collar 103 towards the center so as to enable their insertion in the recess, then they spread out again to bear against the collar 103 inside the recess when the plug is fully in place.

A small section hole (not illustrated), for example of a diameter of the order of 0.5 mm, is preferably provided in the outer side of the plug 12 to make it possible to balance the pressure between the outside of the aircraft and the recess accommodating the screw head. This hole also has the advantage of simplifying the extraction of the plug by means of a suitable tool when replacing the window frame.

In a conventional manner, the window pane 2 integrates an electric circuit 30 terminated by a connector 36 intended to be plugged into a complementary connector 37 integral with the primary structure of the aircraft. In a known manner, the connector 37 can be connected to a cable 38 emerging from the frame 4, said cable 38 is electrically powered by the primary electrical network of the aircraft. In known canopies, the connector 36 of the electric circuit of the window pane is fastened directly to the inner ply 25 of the window pane. The addition according to an embodiment of the invention of a cable 35 between the window pane and the connector 36 provides the ability to connect and disconnect the connector 36 to/from the connector 37 without having to remove the joint cover 39 inside the cockpit so as to access the connector. This additional characteristic consequently reduces even further the time for replacing a canopy according to the invention.

Furthermore, the disadvantage of a connector bonded to the window pane as in the prior art is that it masks part of the field of vision offered by the window pane. By deporting this connector to the end of a cable of approximately 20 cm for example, the gain is not only in ease of access for connection/disconnection, but also in visibility, since, once connected, the connectors can be housed in the space delimited the heel 42 of the frame and the joint cover 39.

The invention extends to any variant accessible to the person skilled in the art, that is to say, any variant included in the framework delimited by the attached claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft canopy comprising:
a laminated window pane, comprising a superposition of plies and having a peripheral edge;
a frame belonging to a primary structure of the aircraft;
a flange fastened to the frame by fastening screws having screw heads retracted into the thickness of the flange, the flange fastened to the peripheral edge of the window pane; and
at each fastening screw, a load-transferring and distributing member inserted between an outer surface of the flange and said fastening screw, a cavity arranged in the flange to accommodate the load-transferring and distributing member, a hole provided at the bottom of the cavity for passing a screw shank of the fastening screw, the load-transferring and distributing member having a recess for accommodating the screw head and a drilled hole for passing the screw shank,
wherein the flange comprises a superposition of plates including an outer plate covering the peripheral edge of the laminated window pane and an inner plate forming an inner surface of the flange, at least part of the inner plate bearing against a web of the frame, wherein at least one of the plates of the flange, qualified as anchoring plate, is embedded between two plies of the window pane along the peripheral edge of the window pane, and wherein at least one cavity is delimited by a peripheral wall comprising, from the inside to the outside of the aircraft:

the wall of the hole made in the inner plate of the flange for passing the screw shank, the load-transferring and distributing member having a cylindrical tubular lower portion inserted in the hole so as to rest on the frame, and a stepped portion formed by sections of the plates of the flange, the load-transferring and distributing member having an outer lateral side with successive projections that is complementary to the stepped portion of the peripheral wall of the cavity.

2. The aircraft canopy according to claim 1, wherein the cavity and the member sink into the thickness of the flange at least down to the anchoring plate.

3. The aircraft canopy according to claim 1, wherein the fastening screws are hexagon-head screws and wherein the recess of the load-transferring and distributing members has a bottom with a flat surface.

4. The aircraft canopy according to claim 1, wherein the anchoring plate is an intermediate plate between the outer plate and the inner plate.

5. The aircraft canopy according to claim 1, wherein the anchoring plate penetrates the laminated window pane over an anchoring depth equal to at least 10 mm.

6. The aircraft canopy according to claim 1, wherein each cavity has a width decreasing from the outside of the aircraft.

7. The aircraft canopy according to claim 1, wherein at least one cavity is delimited by a peripheral wall formed by sections of the plates of the flange.

8. The aircraft canopy according to claim 1, wherein at least one of the cavities is delimited by a peripheral wall formed by sections of the plates of the flange and comprises, from the outside to the inside of the aircraft:

an upper projection at the junction between the outer plate and the plate adjacent to the outer plate of the flange, projection on which an upper outer collar of the load-transferring and distributing member comes to bear;

a truncated portion;

a lower projection at the junction between the anchoring plate and the plate situated above the anchoring plate, the wall of the hole made for passing the screw shank, the load-transferring and distributing member having a cylindrical tubular lower portion inserted in the hole so as to rest on the frame.

9. The aircraft canopy according to claim 1, wherein at least one of the cavities is delimited by a peripheral wall formed by an outer side of the outer plate of the flange, said outer plate turning down into the cavity towards the inside of the aircraft.

10. The aircraft canopy according to claim 1, further comprising:

for each fastening screw, a dry O ring seal between an inner side of the flange and the frame, said dry O ring seal surrounding a tubular lower portion of the member accommodating the screw shank, a dry peripheral seal, interposed between a peripheral lateral side of the flange and a flank of the frame, a dry peripheral seal, interposed between the outer plate of the flange and an outer front side of the laminated window pane, and a dry peripheral seal, interposed between the anchoring plate of the flange and a ply of the window pane that is contiguous with the anchoring plate.

11. The aircraft canopy according to claim 1, further comprising, for each fastening screw, a plug configured to close the recess accommodating the screw head, and to be fastened to the corresponding load-transferring and distributing member by interlocking.

12. The aircraft canopy according to claim 1, wherein the window pane integrates an electric circuit powered by a connector connected to the window pane by an electric cable emerging from the window pane.

* * * * *